US008542121B2

(12) United States Patent
Maruca et al.

(10) Patent No.: US 8,542,121 B2
(45) Date of Patent: Sep. 24, 2013

(54) SYSTEMS AND METHODS FOR IDENTIFYING AND COLLECTING BANNED WASTE

(75) Inventors: Dominic Maruca, Holliston, MA (US); Jerry Leone, Victor, NY (US); Nancy Edwards Cronin, Jericho, VT (US); John A. Kintzer, Waterbury, VT (US)

(73) Assignee: Casella Waste Systems, Inc., Rutland, VT (US)

( * ) Notice: Subject to any disclaimer, the term of this patent is extended or adjusted under 35 U.S.C. 154(b) by 0 days.

(21) Appl. No.: 13/189,200

(22) Filed: Jul. 22, 2011

(65) Prior Publication Data
US 2011/0279227 A1 Nov. 17, 2011

Related U.S. Application Data

(63) Continuation of application No. 12/401,468, filed on Mar. 10, 2009, now Pat. No. 7,994,909, which is a continuation of application No. 11/515,805, filed on Sep. 6, 2006, now Pat. No. 7,501,951.

(51) Int. Cl.
*G08B 13/14* (2006.01)
*G08B 1/08* (2006.01)
(52) U.S. Cl.
USPC ............... 340/572.1; 340/539.1; 340/539.13
(58) Field of Classification Search
USPC ............ 340/539.1, 539.11, 539.12, 539.13, 340/572.1, 572.4, 572.8, 5.61; 235/375, 235/384, 482; 701/1; 209/702
See application file for complete search history.

(56) References Cited

U.S. PATENT DOCUMENTS

| 4,457,772 A | 7/1984 | Haynes et al. |
| 4,688,026 A | 8/1987 | Scribner et al. |
| 5,014,206 A | 5/1991 | Scribner et al. |
| 5,121,853 A | 6/1992 | Edelhoff et al. |

(Continued)

FOREIGN PATENT DOCUMENTS

| EP | 0905057 A1 | 3/1999 |
| EP | 0760985 B1 | 3/2000 |
| EP | 1477430 A1 | 11/2004 |

OTHER PUBLICATIONS

Electronic Services Control website "Whats New," Available at http://web.archive.org/web/20040404035817/coastalcomputercorporation.com/html/overview. Accessed Sep. 14, 2008 (17 pages).

(Continued)

*Primary Examiner* — Van T. Trieu
(74) *Attorney, Agent, or Firm* — Wilmer Cutler Pickering Hale & Dorr LLP.

(57) ABSTRACT

Systems and methods for authorizing a waste item to be removed from a site. In one embodiment, a waste collection vehicle includes a reader configured to obtain identification information from an identification tag associated with the waste item. A transceiver associated with the vehicle is configured to: receive the identification information from the reader, wirelessly transmit the identification information to a remote computer for processing, and wirelessly receive an indication of whether the waste item should be collected and removed by the waste collection. The received indication is based on at least one hazardous characteristic associated with the identified waste item, a determination that the waste collection vehicle is authorized to collect the waste item having the at least one hazardous characteristic, and a determination that a driver of the waste collection vehicle is authorized to collect the waste item having the at least one hazardous characteristic.

21 Claims, 2 Drawing Sheets

(56) References Cited

U.S. PATENT DOCUMENTS

| | | | |
|---|---|---|---|
| 5,326,939 A | 7/1994 | Schafer et al. | |
| 5,340,698 A | 8/1994 | Hirata et al. | |
| 5,340,968 A | 8/1994 | Watanabe et al. | |
| 5,392,926 A | 2/1995 | Schafer et al. | |
| 5,416,706 A | 5/1995 | Hagenbuch | |
| 5,565,846 A | 10/1996 | Geiszler et al. | |
| 5,774,876 A | 6/1998 | Woolley et al. | |
| 5,804,810 A | 9/1998 | Woolley et al. | |
| 5,837,945 A | 11/1998 | Cornwell et al. | |
| 5,892,441 A | 4/1999 | Woolley et al. | |
| 5,947,256 A | 9/1999 | Patterson | |
| 5,959,568 A | 9/1999 | Woolley | |
| 6,191,691 B1 | 2/2001 | Serrault et al. | |
| 6,206,282 B1 | 3/2001 | Hayes, Sr. et al. | |
| 6,211,781 B1 | 4/2001 | McDonald | |
| 6,250,544 B1 | 6/2001 | Chen et al. | |
| 6,448,898 B1 | 9/2002 | Kasik | |
| 6,496,806 B1 | 12/2002 | Horwitz et al. | |
| 6,505,106 B1 | 1/2003 | Lawrence et al. | |
| 6,520,544 B1 | 2/2003 | Mitchell et al. | |
| 6,600,418 B2 | 7/2003 | Francis et al. | |
| 6,601,764 B1 | 8/2003 | Goodwin, III | |
| 6,687,683 B1 | 2/2004 | Harada et al. | |
| 6,690,402 B1 | 2/2004 | Waller et al. | |
| 6,694,248 B2 | 2/2004 | Smith et al. | |
| 6,729,540 B2 * | 5/2004 | Ogawa | 235/384 |
| 6,759,959 B2 | 7/2004 | Wildman | |
| 6,847,892 B2 | 1/2005 | Zhou et al. | |
| 6,867,863 B1 | 3/2005 | Kadlec | |
| 7,117,160 B1 | 10/2006 | Haynes et al. | |
| 7,142,116 B2 | 11/2006 | Yamagiwa | |
| 7,278,571 B2 | 10/2007 | Schmidtberg et al. | |
| 7,287,694 B2 | 10/2007 | Banavar et al. | |
| 7,313,602 B2 | 12/2007 | Ono et al. | |
| 7,318,529 B2 * | 1/2008 | Mallett et al. | 209/702 |
| 7,415,134 B2 | 8/2008 | Ikeda et al. | |
| 7,416,134 B2 | 8/2008 | McDonald | |
| 7,463,142 B2 | 12/2008 | Lindsay | |
| 7,501,951 B2 | 3/2009 | Maruca et al. | |
| 7,522,881 B2 | 4/2009 | Yamagiwa | |
| 2002/0105424 A1 | 8/2002 | Alicot et al. | |
| 2002/0154915 A1 | 10/2002 | Bullock et al. | |
| 2002/0170685 A1 | 11/2002 | Weik et al. | |
| 2002/0196150 A1 | 12/2002 | Wildman | |
| 2003/0067381 A1 | 4/2003 | Mitchell et al. | |
| 2003/0112155 A1 | 6/2003 | Landre et al. | |
| 2003/0132853 A1 | 7/2003 | Ebert | |
| 2003/0158795 A1 | 8/2003 | Markham et al. | |
| 2003/0227392 A1 | 12/2003 | Ebert et al. | |
| 2004/0004119 A1 | 1/2004 | Baldassari et al. | |
| 2004/0012481 A1 | 1/2004 | Brusseaux | |
| 2004/0021579 A1 | 2/2004 | Oursler et al. | |
| 2004/0027243 A1 | 2/2004 | Carrender | |
| 2004/0046672 A1 | 3/2004 | Kasik et al. | |
| 2004/0129781 A1 | 7/2004 | Kreiner et al. | |
| 2004/0133484 A1 | 7/2004 | Kreiner et al. | |
| 2004/0153379 A1 | 8/2004 | Joyce et al. | |
| 2004/0178264 A1 | 9/2004 | Linton et al. | |
| 2004/0199785 A1 | 10/2004 | Pederson | |
| 2005/0004702 A1 | 1/2005 | McDonald | |
| 2005/0055582 A1 | 3/2005 | Bazakos et al. | |
| 2005/0080520 A1 * | 4/2005 | Kline et al. | 701/1 |
| 2005/0209825 A1 * | 9/2005 | Ogawa | 702/188 |
| 2005/0285743 A1 | 12/2005 | Weber | |
| 2006/0251498 A1 | 11/2006 | Buzzoni et al. | |
| 2007/0260466 A1 | 11/2007 | Casella et al. | |
| 2007/0273471 A1 * | 11/2007 | Shilling et al. | 340/5.2 |
| 2008/0191009 A1 | 8/2008 | Gressel et al. | |

OTHER PUBLICATIONS

Fanelli, T. "Coastal Computer Corporation's ESC Software Extend Best Software's Peachtree Capabilities," WorldWire, Mar. 10, 2004 (2 pages).

Murphy, P. "Tennessee Regulatory Authority Memorandum," Jul. 20, 2006 (3 pages).

PCT/US07/005666 International Search Report mailed Dec. 19, 2007 (2 pages).

SwiftCD.com, "SwiftCD Late Payment Policy," Available at http://web.archive.org/web/20050310094935/http://www.swiftcd.com/faq.late.html. Accessed Mar. 21, 2009 (2 pages).

WayBackMachine, SpiderWeave.com Terms of Service, Available at http://webarchive.org/web*//http://spiderweave.com/policies/terms-of-services.html. Accessed Sep. 15, 2008 (4 pages).

* cited by examiner

SYSTEMS AND METHODS FOR IDENTIFYING AND COLLECTING BANNED WASTE

CROSS REFERENCE TO PRIOR APPLICATIONS

This application is a continuation of U.S. patent application Ser. No. 12/401,468 filed Mar. 10, 2009, now U.S. Pat. No. 7,994,909 issued Aug. 9, 2011, and is hereby incorporated by reference in its entirety.

RELATED APPLICATIONS

This application is related to the following copending and commonly assigned patent applications, which are incorporated herein by reference in their entireties: "Systems and Methods for Identifying Banned Waste in a Municipal Solid Waste Environment," having application Ser. No. 11/433,505, filed on May 15, 2006; "Systems for and Methods of Asset Management In a Waste Management Service Environment," having application Ser. No. 11/435,688, now U.S. Pat. No. 7,511,611, filed on May 18, 2006; and "Systems and Methods for Using Billing Information to Dynamically Route Vehicles," having application Ser. No 11/515,788 and attorney docket 105452-312, filed on Sep. 6, 2006.

BACKGROUND OF THE INVENTION

1. Field of the Invention

Embodiments of the present invention relate primarily to the field of waste management and, more particularly, to systems and methods for identifying and collecting hazardous and/or special waste items.

2. Background Description

Waste management companies provide residential, commercial, and municipal waste management and recycling services for communities and organizations. Customers can range from single residences to entire towns or companies. Municipalities may contract with, or other wise engage, a waste management service provider to handle their municipal solid waste ("MSW"). MSW is garbage, refuse, recyclables and other discarded materials that result from residential, commercial, industrial, and community activities. MSW does not include, for example, hazardous waste, animal waste used as fertilizer, or sewage sludge.

Often, residential or commercial customers put waste other than MSW into a waste container. Such waste can generally be termed "banned waste" that must be disposed of properly in order to comply with local, state and/or federal laws and regulations.

One type of banned waste is referred to as hazardous waste. As used herein, hazardous waste is a waste with properties that make it dangerous or potentially harmful to human health or the environment. The universe of hazardous wastes is large and diverse. Hazardous wastes can be liquids, solids, contained gases, or sludges. They can be the by-products of manufacturing processes or simply discarded commercial products, like cleaning fluids or pesticides.

In regulatory terms, a Resource Conservation and Recovery Act (RCRA) hazardous waste is a waste that appears on one of the four hazardous wastes lists (F-list, K-list, P-list, or U-list), or exhibits at least one of four characteristics—ignitability, corrosivity, reactivity, or toxicity. Hazardous waste is regulated under the RCRA Subtitle C.

Another type of banned waste referred to as "special waste" can include items such as household hazardous waste, bulky wastes (refrigerators, pieces of furniture, etc.) tires, and used oil. State and local governments regulate both hazardous and special waste to ensure proper transport and disposal. Generally, only properly permitted and regulated companies are authorized to remove and dispose of these types of waste.

Both hazardous and special wastes are also regulated by local and state governments to ensure, for example, that proper transport and disposal procedures are followed. Often, customers co-mingle banned waste with standard MSW. Generally, only properly permitted and regulated companies are authorized to remove and dispose of these types of waste. If such a waste carrier picks up these banned waste items, either knowingly or unwittingly, the waste carrier may be violating of one or more operating permits and is subject to various penalties, such as monetary fines and/or suspension of one or more permits.

Commonly, for the collection of refuse, a waste management service places waste containers for use at a plurality of customer sites. Waste container types are diverse in the industry and can include, for example, residential or commercial large-volume metal containers such as dumpsters, roll-off containers, rolling lift (or tip) carts, and/or other types of containers.

Conventional processes for tracking the collection of banned waste at various customer sites are largely manually intensive and paper-based, requiring various personnel to handle and process the paper records. Such manual processes are cumbersome and prone to human error.

For example, personnel not properly trained and/or licensed to handle or remove a particular type of waste may inadvertently handle or remove such waste. The lack of cross-checking and immediate feedback in conventional systems may result in unauthorized personnel removing such waste, thereby creating health and/or safety risks to themselves and others. We have discovered that there exists a need to automate the manner in which banned waste is identified, in a manner that would reduce cost, enhance safety, and comply or facilitate compliance with applicable health and safety laws and regulations.

SUMMARY OF EMBODIMENTS OF THE INVENTION

Embodiments of the present invention relate to systems and methods that can be used to ensure that proper procedures are followed throughout the removal and disposal of banned waste, to prevent banned waste from entering the MSW stream, and to prevent regulatory violations. Various embodiments of the present invention use RFID technology and positioning technology to identify a customer site and the waste items at the customer site, in order to determine an appropriate action to be performed. In addition, in order to ensure that banned waste items are properly collected, various embodiments of the present invention can verify that qualified personnel and proper collection equipment are in place, and/or verify that there is a disposal destination available for waste disposal.

In one embodiment of the invention, a waste collection vehicle includes a reader configured to obtain identification information from an identification tag associated with the waste item. The identification tag may be a radio frequency identification (RFID) tag. A transceiver is associated with the waste collection vehicle, that is configured to: receive the identification information from the reader, wirelessly transmit the identification information to a remote computer for processing, and wirelessly receive an indication of whether the waste item should be collected and removed by the waste collection. The received indication is based on at least one hazardous characteristic associated with the identified waste item, a determination that the waste collection vehicle is authorized to collect the waste item having the at least one hazardous characteristic, and a determination that a driver of the waste collection vehicle is authorized to collect the waste item having the at least one hazardous characteristic. The received indication may also be based on a location at which the waste collection vehicle will deposit the waste item. The collection vehicle further includes a camera to record an image of the waste item.

The transceiver may also receive position coordinates of the waste collection vehicle. The transceiver may transmit the position coordinates to a remote computer, and receive an indication of whether the position coordinates are associated with a customer in good standing. The remote computer may utilize at least one data repository to determine the at least one hazardous characteristic associated with the identified waste item, that the waste collection vehicle is authorized to collect the waste item having the at least one hazardous characteristic, and that the driver of the collection vehicle is authorized to collect the waste item having the at least one hazardous characteristic.

In another embodiment of the present invention, a method for authorizing a vehicle to remove waste items from a site includes reading identification information from an identification tag associated with the waste item, wirelessly transmitting the identification information from the collection vehicle to a remote computer for processing, and receiving wirelessly at the collection vehicle an indication of whether the waste item should be collected and removed by the waste collection vehicle. The indication is based on at least one hazardous characteristic associated with the identified waste item, a determination that the waste collection vehicle is authorized to collect the waste item having the at least one hazardous characteristic, and a determination that a driver of the waste collection vehicle is authorized to collect the waste item having the at least one hazardous characteristic. The identification tag may be a radio frequency identification tag. The received indication may also be based on a location at which the waste collection vehicle will deposit the waste item.

The method may also include receiving at the waste collection vehicle position coordinates of the waste collection vehicle. The position coordinates may be transmitted from the waste collection vehicle to a remote computer, and the collection vehicle may also receive an indication of whether the position coordinates are associated with a customer in good standing.

The method may also include utilizing the at least one data repository to determine the at least one hazardous characteristic associated with the identified waste item, that the waste collection vehicle is authorized to collect the waste item having the at least one hazardous characteristic, and that the driver of the collection vehicle is authorized to collect the waste item having the at least one hazardous characteristic.

In another embodiment of the present invention, a waste collection vehicle, includes a reader configured to obtain identification information from an identification tag associated with the waste item, and at least one data repository that utilizes the identification information to determine whether the waste item should be collected and removed by the waste collection vehicle. The determination is based on at least one hazardous characteristic associated with the identified waste item, a determination that the waste collection vehicle is authorized to collect the waste item having the at least one hazardous characteristic, and a determination that a driver of the waste collection vehicle is authorized to collect the waste item having the at least one hazardous characteristic. The identification tag may be a radio frequency identification tag. The determination can also be based on utilizing at least one data repository to determine a location at which the waste collection vehicle will deposit the waste item. The waste collection vehicle may also include a camera to record an image of the waste item.

The waste collection vehicle may also include a transceiver that receives position coordinates of the waste collection vehicle. The transceiver transmits the position coordinates to a remote computer, and receives from the remote computer an indication of whether the position coordinates are associated with a customer in good standing.

BRIEF DESCRIPTION OF THE DRAWINGS

The Detailed Description of the Invention, including the description of various embodiments of the invention, will be best understood when read in reference to the accompanying figures wherein.

DETAILED DESCRIPTION OF EMBODIMENTS OF THE INVENTION

Figure 1:
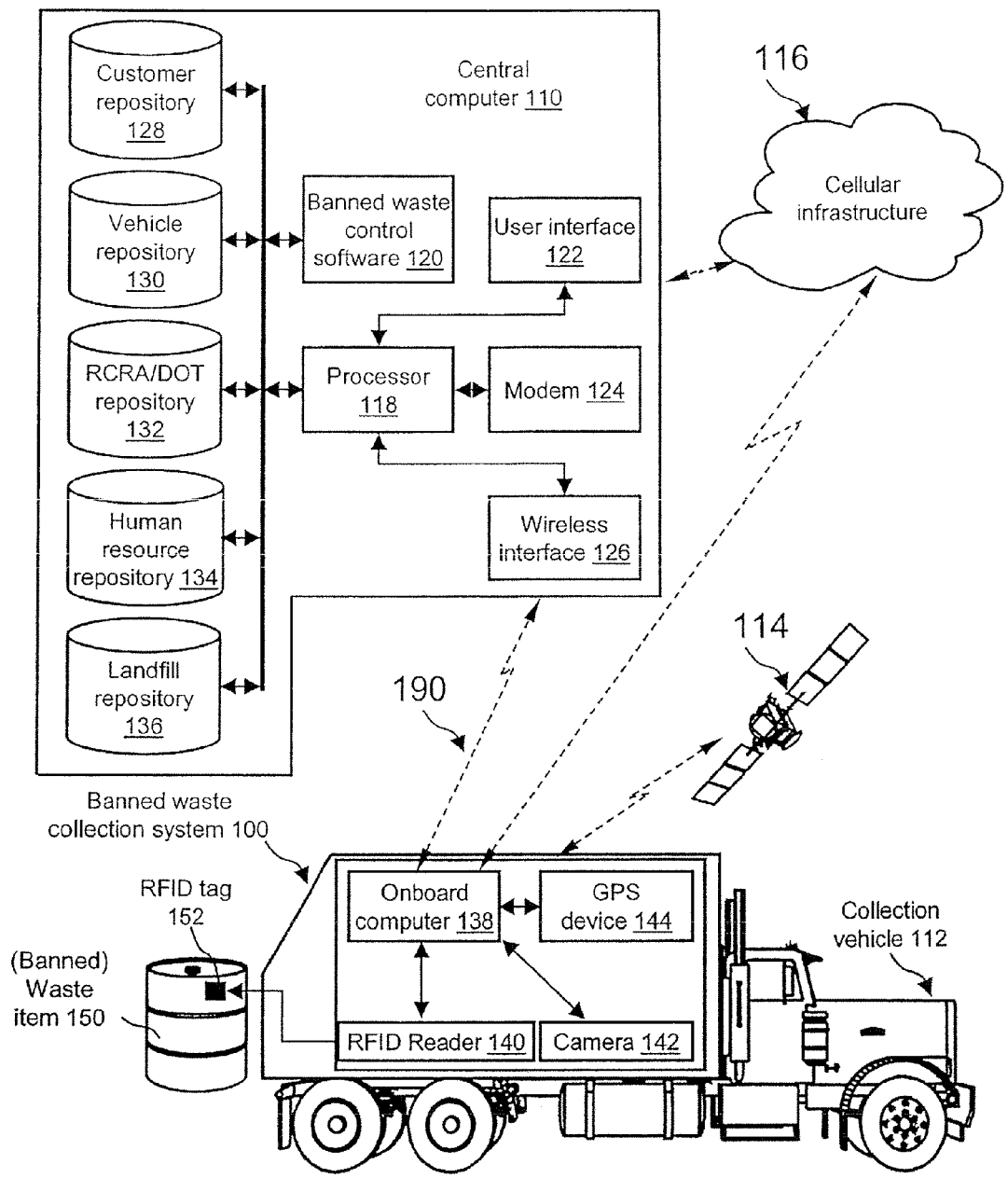
FIG. 1 is a block diagram of an exemplary banned waste collection system in accordance with an embodiment of the present invention.

FIG. 1 is a block diagram of an exemplary banned waste collection system 100. Central computer 110, global positioning system ("GPS") system 114, and cellular infrastructure 116 each communicate with system 100. GPS system 114 is a standard global positioning system that supplies position data, such as digital latitude and longitude. Collection vehicle 112 can include onboard computer 138, RFID reader 140, GPS device 144, and camera 142.

Collection vehicle 112 can be, for example, a conventional waste hauling truck that is used to collect refuse, as is well known in the industry. To remove banned items, vehicle 112 can be driven to various sites such as commercial and industrial sites, residential curbsides, and/or community drop-off points.

Onboard computer 138 can be a self-contained computing apparatus that is well known and in common use, such as a standard desktop or laptop personal computer ("PC"). Alternatively, onboard computer 138 can be a computing apparatus such as a general purpose PC that is physically integrated with vehicle 112. An onboard computer 138, such as sold by Glacier Computer (New Milford, Conn.) or by Mobile Computing Corporation (Charlottesville, Va.), can be used.

Onboard computer 138 can include industry standard components (not shown), such as a standard user interface (e.g., a monitor), a processor, a storage device (e.g., a hard disk drive), and a clock device that can be used to provide timestamp data. Onboard computer 138 may also include standard operating system software, such as the Microsoft Windows® operating system, as well as include and/or utilize various standard interfaces (e.g., universal serial bus ("USB") ports) that can be used to communicate with reader 140, GPS device 144, and camera 142.

In some embodiments, onboard computer 138 can include a wireless interface (not shown) to facilitate communication with central computer 110 via cellular infrastructure 116. Onboard computer 138 also can include or utilize a standard modem (not shown) to communicate with central computer 110 via cellular infrastructure 116. In addition, onboard computer 138 can include a wireless interface (not shown) that utilizes, for example, the IEEE 802.11 standard to communicate with central computer 110 via communication link 190.

RFID tag 152 is attached to a waste item 150. As used herein, a waste item 150 may also be characterized as a banned waste item 150 as determined by reading RFID tag 152. If waste item 150 is a banned waste item 150, RFID tag 152 will contain information identifying one or more characteristics of the banned waste item 150. The Resource Conservation and Recovery Act (RCRA) characteristics of ignitability, corrosivity, reactivity, and toxicity, for example, may be used to characterize banned waste items 150.

In one or more embodiments, identification information stored in RFID tag 152 can be a digital identification number that uniquely identifies one or more characteristics of banned waste item 150. For example, if banned waste item 150 is ignitable, it may have identifier 001 associated therewith. If banned waste item 150 is corrosive, it may have identifier 002 associated therewith. If banned waste item 150 is reactive, it may have identifier 003 associated therewith. If banned waste item 150 is toxic, it may have identifier 004 associated therewith.

RFID tag 152 may contain one or more identifiers for a given banned waste item 150. For example, a banned waste item 150 may contain identifiers 001, 003 and 004 to respectively indicate that the banned waste item 150 is ignitable, reactive and toxic.

Other identifiers may also, of course, be used to indicate or designate other banned waste item 150 characteristics. For example, the U.S. Environmental Protection Agency (EPA) provides a list of hazardous waste items. Listed EPA items may also have identification information associated therewith and stored in RFID tag 152, so that such items can be identified when read by RFID reader 140.

RFID reader 140 can read the identification information and can transmit the information to onboard computer 138. RFID reader 140 can be a commercially available RFID tag reader system, such as the TI RFID system, manufactured by Texas Instruments (Dallas, Tex.).

GPS device 144 communicates with GPS system 114 to obtain the location of collection vehicle 112, and therefore the location of the customer site where banned waste item 150 is located, after vehicle 112 has arrived at the customer site. GPS device 144 transmits location information, such as digital latitude and longitude, to onboard computer 138. GPS device 144 can be, for example, the GEOTAB GPS system, which is a commercially available vehicle fleet and productivity management system manufactured by GEOTAB (Burlington, Ontario, Canada).

Camera 142 can be a standard, wide angle video security camera, such as a Ganz D/N Hi/Res A/I 8.5-40 mm camera, which captures images of banned waste items 150 at collection sites. The images may be transmitted to and stored by onboard computer 138.

Onboard computer 138 receives the identification information of banned waste item 150 from reader 140, and the location of customer site from GPS device 144. In the embodiment shown in FIG. 1, onboard computer 138 transmits the information from reader 140 and GPS device 144 to central computer 110 for processing and analysis, as will be described herein. In one or more other embodiments, onboard computer 138 uses the information from reader 140 and GPS device 144 to determine the specific procedures and requirements for collecting and disposing of banned waste item 150. In these embodiments, onboard computer 138 may have the same (or substantially same) contents as central computer 110. That is, onboard computer 112 will have the contents of customer repository 128, vehicle repository 130, RCRA/Department of Transportation (DOT) repository 132, human resource repository 134, and landfill repository 136.

Central computer 110 can be a standard laptop or desktop computer. As shown, central computer 110 may include standard components such as processor 118 and user interface 122. Processor 118 can be a standard microprocessor, such as a Pentium® processor supplied by Intel Corporation (Santa Clara, Calif.), or a PowerPC® microprocessor device supplied by IBM Corporation (Armonk, N.Y.). User interface 122 can be a standard computer user interface for inputting and displaying data, such as a keyboard and mouse or a touch screen with accompanying menus and prompts.

Central computer 110 also includes modem 124 for wireless communication with system 100 through cellular infrastructure 116. Cellular infrastructure 116 can include one or more cell towers and other cellular network interconnections, as is well known. Modem 124 can be a wireless cell phone modem, such as is provided by CYNET, Incorporated (Houston, Tex.), which can communicate with a modem (not shown) on onboard computer 138 through cellular infrastructure 116. In addition to, or as an alternative to modem 124, central computer 110 may also include, for example, a wireless interface 126 that operates in accordance with the IEEE 802.11 standard, to enable communication between central computer 110 and onboard computer 138 using the IEEE 802.11 standard.

Central computer 110 may include banned waste control software 120 that communicates with multiple data repositories, such as customer repository 128, vehicle repository 130, RCRA/DOT repository 132, human resource repository 134, and/or landfill repository 136. The contents of repositories 128, 130, 132, 134, and 136 are discussed herein. The contents of repositories 128, 130, 132, 134, and 136 may vary, and be combined or organized in any manner. Repositories 128, 130, 132, 134, and 136 can be standard relational databases. Software 120 executes the flow of the method steps of FIG. 2 interacting with the various system elements of system 100 of FIG. 1 and personnel.

Customer repository 128 can include, for example, information pertaining to a plurality of customer accounts. Such information may include customer site location, route data, items expected to be removed from the customer site, and/or billing data. For example, using the location (e.g., street address, city, state, and zip code) of a customer site, software 120 may find the corresponding customer account in repository 128 and determine any banned waste items 150 that are expected to be removed from the customer site. Banned waste item(s) 150 that are expected to be removed from the customer site will generally have an identifier associated therewith such that the identifier stored on RFID tag 152 will match or correspond with an identifier in RCRA/DOT repository 132.

Vehicle repository 130 can include a collection of vehicle 112 records, including the permit(s) that each collection vehicle 112 carries regarding waste transportation. For example, onboard computer 138 may transmit a vehicle identifier to central computer 110. For a particular collections vehicle 112 having a vehicle identifier associated therewith, software 120 may find the vehicle record, corresponding to the vehicle identifier, in repository 130, and determine whether vehicle 112 is authorized to remove one or more characteristics of ignitability, corrosivity, reactivity, or toxicity.

RCRA/DOT repository 132 can contain a collection of information associated with the identification, collection, and management of banned waste items 150 according to RCRA/DOT requirements. Repository 132 may include federal, state, or local regulatory information pertaining to various types of banned waste, as well as data pertaining to recoverable and/or non-recoverable items indexed by identification information contained in the respective RFID tags 152 of banned waste items 150.

Given the identification information read from RFID tag 152, software 120 may access repository 132 to determine, for example, whether waste item 150 is a glass container, a plastic container, an aluminum container, a paper product, or a banned (e.g., hazardous) waste item 150. If a waste item 150 is a banned waste item 150, software 120 may use repository 132 to determine the type of banned waste item 150 according to RCRA/DOC classification, as well as the corresponding procedures and/or requirements for collecting and disposing of banned waste item 150.

Human resource repository 134 can include a collection of human resource information, such as employee training, license requirements, and/or a record of employee qualifications and certification. For example, given the identity of a person, software 120 may find a corresponding record of qualifications in repository 134 and determine whether the person is authorized to remove certain types of banned waste items 150.

Landfill repository 136 can include a collection of information pertaining to each landfill and/or municipality. For example, landfill repository 136 may include information pertaining to the types of permitted waste materials, quantity limits, and hours of operation. Using repository 136, software 120 may ascertain whether a landfill is currently accepting a certain type of banned waste item 150.

Figure 2:
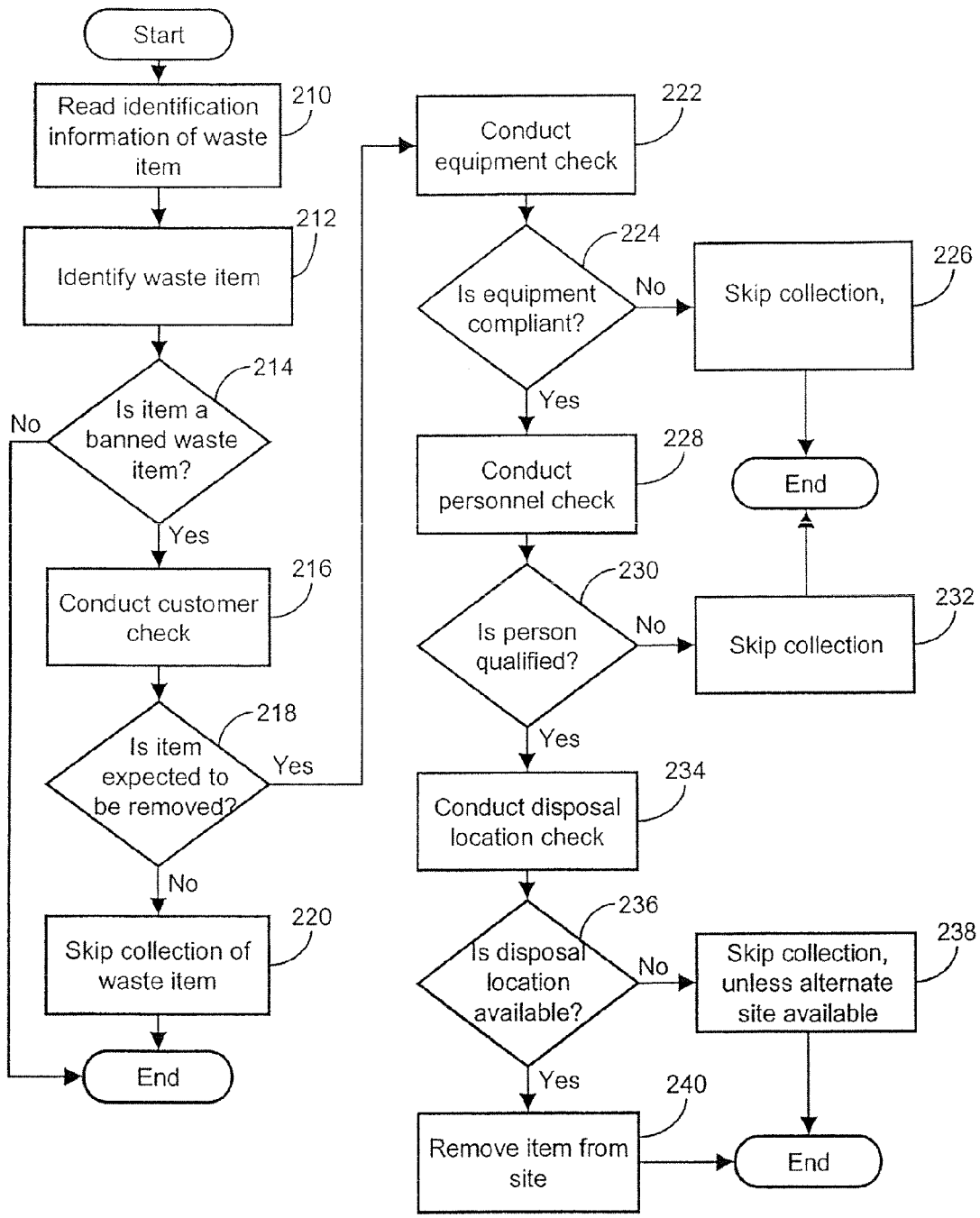
FIG. 2 is a flow chart illustrating an exemplary method of identifying and collecting banned waste in accordance with an embodiment of the present invention.

FIG. 2 is a flow chart illustrating various methods of identifying and collecting banned waste items 150. At step 210, after vehicle 112 has arrived at a customer site, vehicle 112 obtains the identification information contained in RFID tag 152 using RFID reader 140.

At step 212, identifying indicia is read on RFID tag using RFID reader 140, to determine whether waste item 150 is a banned waste item 150. Identification of the type of banned waste item 150 can be determined when information pertaining to the type of banned waste item 150 is contained in or accessible via RFID tag 152. For example, RCRA/DOT repository 132 can be queried using the identification information to obtain information pertaining to banned waste item 150 such as ignitability, corrosivity, reactivity, toxicity, the chemical abstract number (CAS) and/or a generic chemical description. Camera 142 may be used to photograph the particular banned waste item 150 identified. The photograph can be transmitted to and stored in computer 110 in order to maintain a visual record of any banned waste item 150 that is picked-up by collection vehicle 112.

In some embodiments, repository 132 can be included in or associated with central computer 110. In these embodiments, system 100 transmits the identification information from onboard computer 138 to central computer 110 using a wireless connection. Banned waste control software 120 may then query RCRA/DOT repository 132 using the identification information.

At decision step 214, if waste item 150 is not a banned waste item 150, reader 140 may be used to read tag 152 for other waste items 150 at the site, leave the site if there are no other waste items 150, or remove waste items 150 that are not banned waste items 150. If, at decision step 214, it is determined that a banned waste item 150 such as a hazardous special waste item is present then, at step 216, system 100 may conduct a customer check.

Waste collection companies will generally know before pick-up of banned waste item(s) 150 that a customer has requested such service. In circumstances where a bona fide customer exits, but the banned waste item 150 is not what was requested to be removed, the customer has, knowingly or unknowingly, made a request for waste removal that may violate the waste management security of handling waste materials, potentially rendering the waste management companies liable for such hazardous waste.

To verify that a bona fide customer is being serviced, software 120 can first identify the customer site using the location of the customer site obtained by GPS device 144. For example, at a given pickup site (customer), collection vehicle 112 may receive GPS coordinates via GPS system 114, and transmit those coordinates to onboard computer 138. Onboard computer 138 may have a database that correlates active customers in good standing with their respective GPS coordinates. A database may be utilized such as described in the following copending and commonly assigned patent application, which is incorporated herein by reference in its entirety: Systems for and Methods of Asset Management In a Waste Management Service Environment, having application Ser. No. 11/435,688, filed on May 18, 2006. If onboard computer 138 determines that GPS coordinates transmitted by collection vehicle 112 are not associated with or do not pertain to an existing customer, or that an existing customer is not in "good status" and thus should not be provided service, onboard computer 138 provide an indication to the driver of collection vehicle 112 that the location that collection vehicle 110 is presently at should not be serviced.

Once it had been determined that the customer is an active, bona fide customer, software 120 may then query customer repository 128, obtain a list of any banned waste items 150 expected to be removed from the customer site, and compare the list with the data read from RFID tag 152 at the customer site. In doing so, software 120 verifies that a bona fide customer has requested the waste removal. Determining and verifying the customer is useful, particularly since waste management companies are generally liable and responsible for hazardous waste when the source or owner of such waste cannot be identified.

At decision step 218, if it is determined that banned waste item 150 is not expected to be removed, then, at step 220, vehicle 112 skips collecting banned waste item 150. If banned waste item 150 is expected to be removed, system 100 may conduct an equipment check at step 222. For example, software 120 may query vehicle repository 130 in order to determine whether collection vehicle 112 is authorized to remove banned waste item 150 having certain characteristic(s) (e.g., ignitability).

At decision step 224, if it is determined that vehicle 112 is not permitted and regulated to collect banned waste item 150, vehicle 112 skips the collection at 226. If it is determined that vehicle 112 is permitted and authorized to collect banned waste item 150, system 100 may also conduct a personnel check at step 228. For example, software 120 may query human resource repository 134 using the identity, for example, of the driver of vehicle 112, in order to determine whether the person is authorized to remove the identified banned waste item(s) 150.

At decision step 230, if it is determined that the driver of vehicle 112 is not authorized to remove banned waste item(s) 150, vehicle 112 skips the collection at step 232. If it is determined that the driver of vehicle 112 is authorized to remove banned waste item(s) 152, system 100 may further conduct a disposal location check at step 234. For example, software 120 may query landfill repository 136 in order to determine whether the disposal location for banned waste item(s) 150 accepts such a type of banned waste item 150 and/or is currently open and accepting such banned waste items 150.

At decision step 236, if it is determined that the disposal location for banned waste item 150 does not accept such items or is otherwise unavailable, vehicle 112 skips the collection at step 238. If it is determined that the disposal location for banned waste item(s) 150 accepts such items and is currently available, vehicle 112 then completes the removal operation of banned waste item 150 at step 240 and subsequently disposes of banned waste item(s) 150.

Other embodiments, extensions, and modifications of the ideas presented above are comprehended and within the reach of one skilled in the art upon reviewing the present disclosure. Accordingly, the scope of the present invention in its various aspects should not be limited by the examples and embodiments presented above. The individual aspects of the present invention, and the entirety of the invention should be regarded so as to allow for modifications and future developments within the scope of the present disclosure. The present invention is limited only by the claims that follow.

What is claimed is:

1. A system for authorizing a waste item to be removed from a customer site, comprising:
    a waste collection vehicle comprising a reader configured to obtain identification information from an identification tag associated with the waste item; and
    a transceiver associated with the waste collection vehicle, configured to:
        receive the identification information from the reader;
        receive a list of waste items expected to be removed from the customer site, such that a customer request to remove a waste item is verified;
        wirelessly transmit the identification information to a remote computer for processing;
        wirelessly receive an indication of whether the waste item should be collected and removed by the waste collection vehicle; and wirelessly transmits position coordinates of the waste collection vehicle to the remote computer.

2. The system according to claim 1, wherein the identification tag is a radio frequency identification tag.

3. The system according to claim 1, wherein the received indication is further based on a location at which the waste collection vehicle will deposit the waste item.

4. The system of claim 1, wherein the transceiver receives position coordinates of the waste collection vehicle.

5. The system according to claim 4, wherein the transceiver receives an indication of whether the position coordinates are associated with a customer in good standing.

6. The system according to claim 5, wherein the remote computer utilizes at least one data repository to determine i) at least one hazardous characteristic associated with the identified waste item, ii) that the waste collection vehicle is authorized to collect the waste item having the at least one hazardous characteristic, and iii) that the driver of the collection vehicle is authorized to collect the waste item having the at least one hazardous characteristic.

7. The system according to claim 1, wherein the collection vehicle further comprises a camera to record an image of the waste item.

8. The system according to claim 1, wherein the transceiver is configured to receive an indication whether a waste collection facility allows a predetermined type of waste.

9. A method for authorizing a collection vehicle to remove waste item from a site, comprising:
    reading identification information from an identification tag associated with the waste item;
    wirelessly transmitting the identification information from the collection vehicle to a remote computer for processing;
    receiving wirelessly at the collection vehicle a list of waste items expected to be removed from a customer site, such that a customer request to remove a waste item is verified;
    receiving wirelessly at the collection vehicle an indication of whether the waste item should be collected and removed by the collection vehicle; and
    wirelessly transmit position coordinates of the waste collection vehicle to the remote computer.

10. The method of claim 9, wherein the identification tag is a radio frequency identification tag.

11. The method according to claim 9, wherein the received indication is further based on a location at which the collection vehicle will deposit the waste item.

12. The method according to claim 9, further comprising receiving at the collection vehicle position coordinates of the collection vehicle.

13. The method according to claim 12, further comprising:
    receiving an indication of whether the position coordinates are associated with a customer in good standing.

14. The method according to claim 9, further comprising receiving wirelessly an indication whether a waste collection facility allows a predetermined type of waste.

15. A waste collection vehicle, comprising:
    a reader configured to obtain identification information from an identification tag associated with the waste item at a customer site;
    at least one data repository that utilizes the identification information to determine whether the waste item should be collected and removed from THE customer site;
    at least one data repository that utilizes the identification information to determine whether the waste item should be collected and removed by the waste collection vehicle and
    wirelessly transmit position coordinates of the waste collection vehicle to the remote computer.

16. The waste collection vehicle according to claim 15, wherein the identification tag is a radio frequency identification tag.

17. The waste collection vehicle according to claim 15, wherein the determination is further based on utilizing the at least one data repository to determine a location at which the waste collection vehicle will deposit the waste item.

18. The waste collection vehicle of claim 15, further comprising a transceiver that receives position coordinates of the waste collection vehicle.

19. The waste collection vehicle according to claim 18, wherein the transceiver receives from the remote computer an indication of whether the position coordinates are associated with a customer in good standing.

20. The waste collection vehicle according to claim 18, wherein the data repository utilizes the position coordinates to indicate whether a customer associated with the position coordinates is in good standing.

21. The waste collection vehicle according to claim 15, wherein the collection vehicle further comprises a camera to record an image of the waste item.

* * * * *